(12) United States Patent
Otte et al.

(10) Patent No.: US 9,164,784 B2
(45) Date of Patent: Oct. 20, 2015

(54) SIGNALIZING AN EXTERNAL EVENT USING A DEDICATED VIRTUAL CENTRAL PROCESSING UNIT

(75) Inventors: Carsten Otte, Stuttgart (DE); Christian Borntraeger, Stuttgart (DE)

(73) Assignee: INTERNATIONAL BUSINESS MACHINES CORPORATION, ARMONK, NY (US)

( * ) Notice: Subject to any disclaimer, the term of this patent is extended or adjusted under 35 U.S.C. 154(b) by 1736 days.

(21) Appl. No.: 12/244,244

(22) Filed: Oct. 2, 2008

(65) Prior Publication Data

US 2009/0100424 A1  Apr. 16, 2009

(30) Foreign Application Priority Data

Oct. 12, 2007  (EP) ..................................... 07118349

(51) Int. Cl.
*G06F 9/45*  (2006.01)
*G06F 9/455*  (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 4,445,177 A * | 4/1984 | Bratt et al. ..................... 712/245 |
| 6,393,026 B1 * | 5/2002 | Irwin ............................ 370/401 |
| 7,428,485 B2 * | 9/2008 | Armstrong et al. .............. 703/21 |
| 7,577,722 B1 * | 8/2009 | Khandekar et al. ........... 709/220 |
| 7,865,893 B1 * | 1/2011 | Omelyanchuk et al. .......... 718/1 |
| 2005/0265317 A1 * | 12/2005 | Reeves et al. ................. 370/352 |
| 2005/0273571 A1 * | 12/2005 | Lyon et al. .................... 711/203 |
| 2008/0184373 A1 * | 7/2008 | Traut et al. ...................... 726/26 |
| 2008/0294808 A1 * | 11/2008 | Mahalingam et al. .......... 710/26 |
| 2010/0223611 A1 * | 9/2010 | Mahalingam et al. ............ 718/1 |

* cited by examiner

*Primary Examiner* — William B Partridge
(74) *Attorney, Agent, or Firm* — The Steadman Law Firm PLLC; Thomas E. Tyson; James R. Nock (57) ABSTRACT

Various embodiments of a virtualization system and method are provided herein, wherein computer resources are emulated and simulated by a hypervisor system. In order to provide improved signalization within a virtual computer system, various embodiments may use a virtual CPU for signalizing an external event, wherein the virtual CPU is used temporarily by a signalization routine for processing the signalization of the event.

20 Claims, 6 Drawing Sheets

SIGNALIZING AN EXTERNAL EVENT USING A DEDICATED VIRTUAL CENTRAL PROCESSING UNIT

CROSS-REFERENCE TO RELATED APPLICATIONS

This application claims priority under 35 U.S.C. §119 to European Patent Application No. 07118349.5 filed Oct. 12, 2007, the entire text of which is specifically incorporated by reference herein.

1. BACKGROUND OF THE INVENTION

The various embodiments described herein relate to the field of computer technology, particularly to the area of virtualization, wherein computer resources are emulated and simulated by a hypervisor system in order to offer the possibility of replacing computing resources such as storage, applications, and computational resources of a workstation with virtual computing resources. These virtual resources are backed by the hypervisor using real physical resources that are available on network or local systems. The hypervisor can multiplex physical resources for more efficient use of computing facilities. More specifically, method and system embodiments are provided for operating a hypervisor system in a hypervisor system environment comprising at least one guest system having an operating system, wherein an external event (e.g., from system timers, disks input/output (I/O), power-off signals, sensing key-presses, etc.) is signaled from the hypervisor system to a respective guest system.

"Virtualization" in virtualized environments is a general and broad term that refers in the context of computer science to the emulation and simulation of computer resources. Whereas abstraction usually hides details, virtualization pertains to creating illusions. Instead of hiding the physical characteristics of computing resources from the way in which other systems, applications, or end users interact with such resources, these are usually emulated and simulated in order to behave in a virtualized environment in the same way as they would on native hardware.

The interfaces and resources of a virtualized system are mapped onto the respective interface and resources of a real physical system.

Figure 1A:
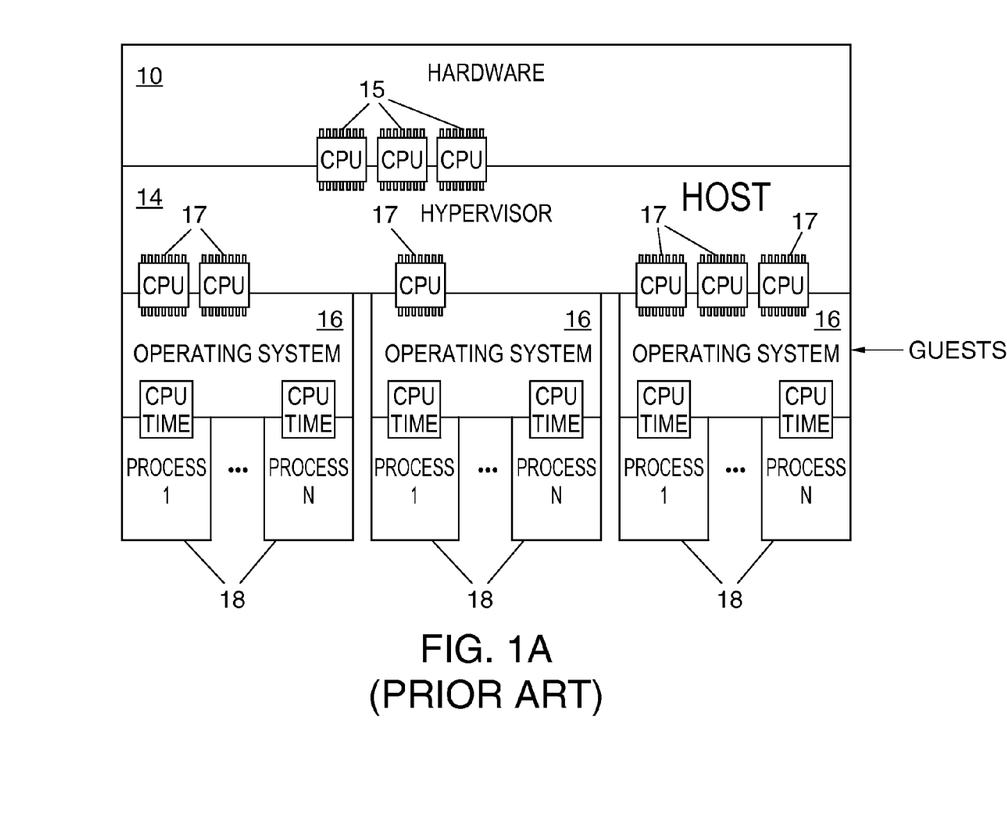
FIGS. 1A and 1B illustrate the most basic structural components of a prior art hardware and software environment used for a prior art method.
Figure 1B:
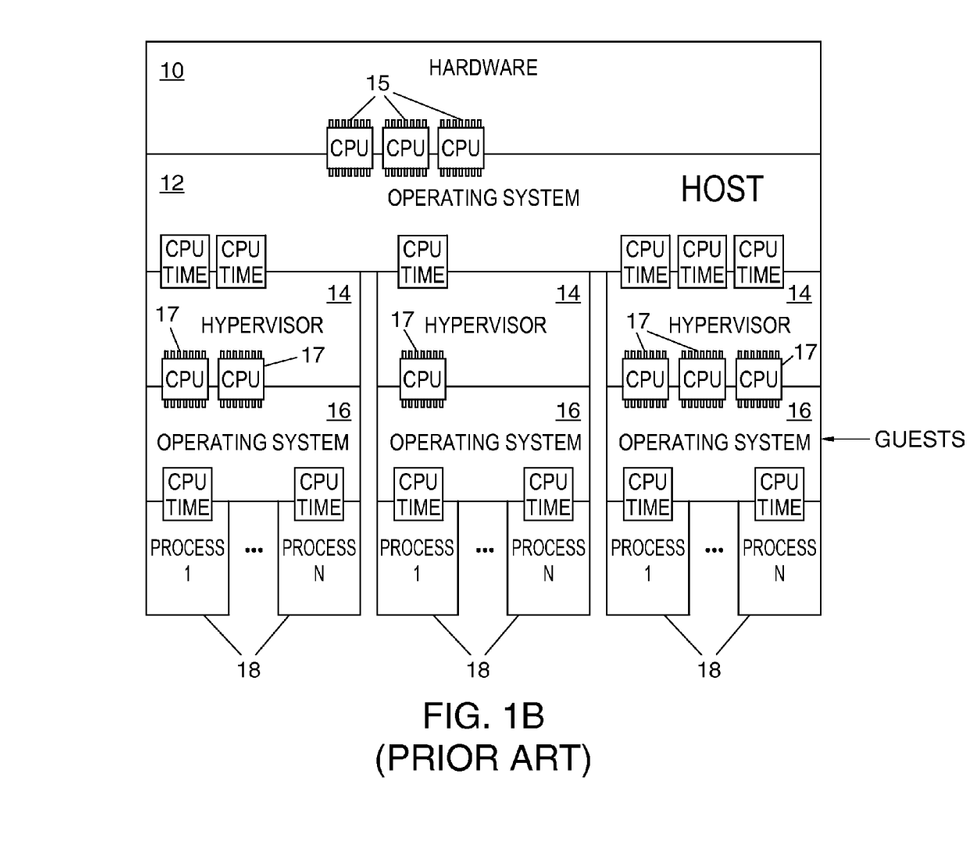

FIGS. 1A and 1B schematically show the main components in a hypervisor environment for two different implementation types. The primary components include the hardware 10, a host operating system 12, a hypervisor software module 14, a guest operating system 16, and guest processes 18. As depicted in FIGS. 1A and 1B, a component can use interfaces and resources, particularly physical central processing units (CPUs) 15 and virtual (guest) CPUs 17.

Typical resources are processors (depicted as CPUs in FIGS. 1A and 1B), processor time (not depicted), and memory (not depicted). For example, in FIG. 1A, the hypervisor 14 uses hardware interfaces such as CPU operation codes (opcodes) and hardware resources such as installed memory. The guest operating systems 16 use hypervisor interfaces and hypervisor resources. The guest programs invoke the respective different processes 18 using interfaces and resources of the respective guest operating systems 16.

FIGS. 1A and 1B illustrate two different types of prior art hypervisor implementations. The first type—shown in FIG. 1A—is to have the hypervisor 14 use the hardware interfaces 15 directly. This variant provides virtual machines 17 as interfaces to its guest operating systems 16. The guest operating systems 16 use these virtual machines 17 for their processes (applications or programs).

The second implementation type for hypervisor systems is outlined in FIG. 1B. In this scheme, the real physical hardware 10 is driven by a host operating system 12. A hypervisor 14 is a program that uses interfaces from the host operating system 12. This scheme is used in prior art hypervisor systems such as VMWARE, KVM and others. A hypervisor 14 then provides virtual machines 17 to its respective guest operating system 16. A guest operating system 16 uses one or more virtual machines 17 for its processes (applications or programs).

Signalization mechanisms, such as interrupt handling and the various other embodiments described herein, may occur at the hypervisor/guest operating system interface (see arrow 30 in FIG. 2) and thus may work on both types of hypervisors. In order to increase clarity of the disclosure, a simplified component stack will be used that describes both implementation types. More specifically, instead of using the terms "hypervisor" or "host operating system plus hypervisor," the term "host" is used for both implementation types.

Figure 2:
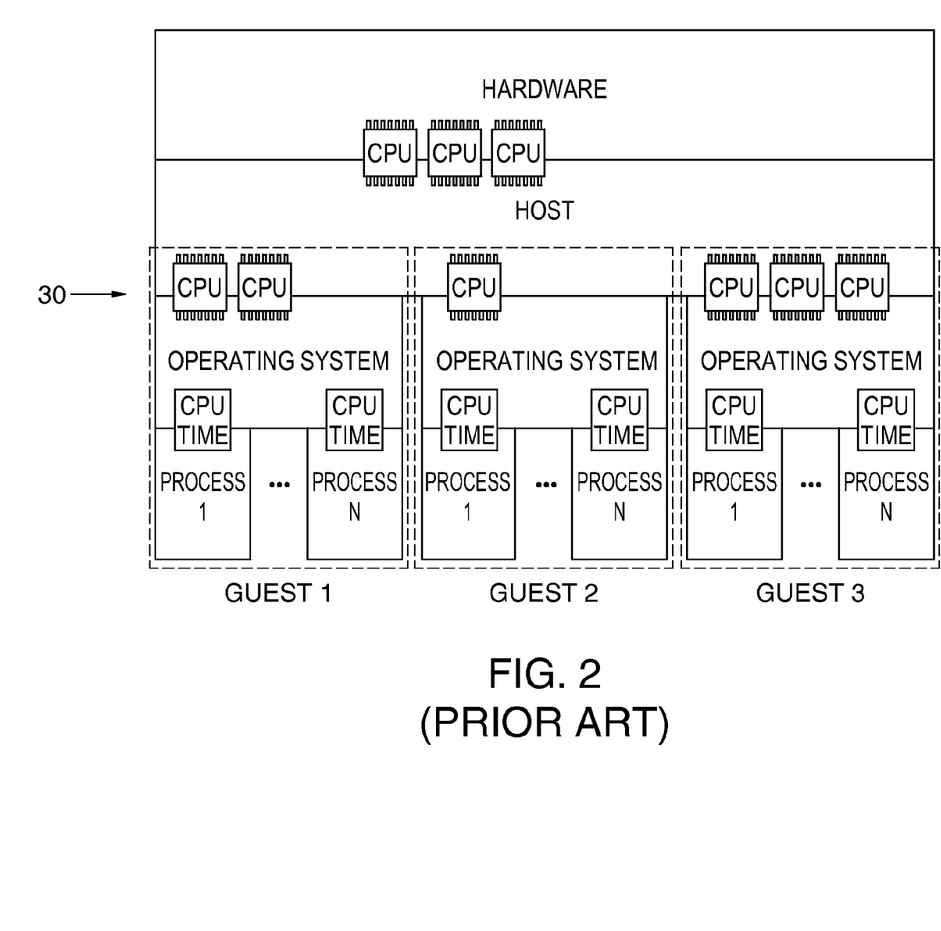
FIG. 2 illustrates the structural components of a prior art hardware and software environment as shown in FIGS. 1A and 1B, abstracting so that FIGS. 1A and 1B are both represented by a simplified component stack.

FIG. 2 illustrates the simplified component stack.

Inter-system signalization of runtime events is performed in prior art either using interrupt handling or polling. Typical interrupt uses include system timers, disks I/O, power-off signals, sensing key-presses, etc.

Figure 3:
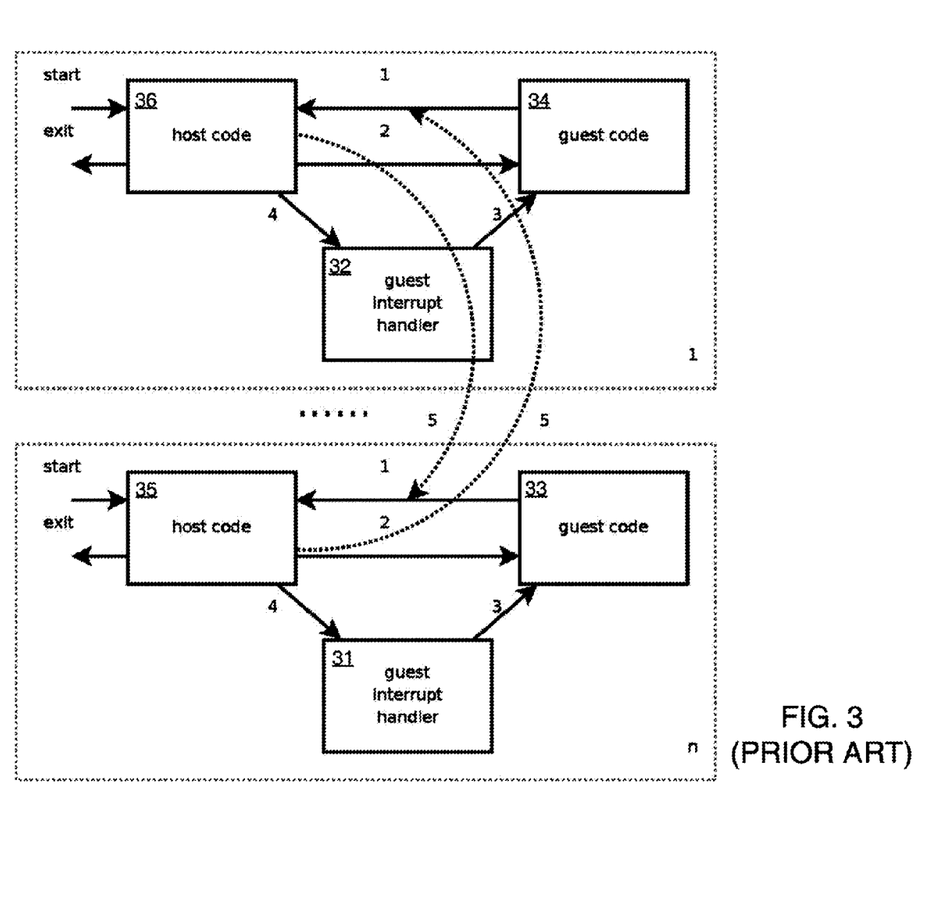
FIG. 3 illustrates the control flow of a prior art signalization method.

FIG. 3 illustrates the most important state changes of host and guest code that run on a processor. The prior art interrupt delivery is a standard way of notifying an operating system about external events, as briefly mentioned above. Control flows that can run independently on different physical processors are separated by dotted boxes in FIG. 3.

With the prior art interrupt delivery, the program flow is interrupted, the status information is saved, and the control flow continues at a predefined location. An interrupt handler coordinates the execution of an interrupt routine. In hosted environments there are two types of interrupt handlers. Host interrupts are handled by a host interrupt handler, which is part of the host code. Guest interrupts are handled by the guest interrupt handler, which is part of the guest operating system.

Both handler modules are part of one of the controlling programs (guest operating system or host program) and handle the respective prior art signaling. The interrupt handler runs and triggers actions in the operating system. At the end of the interrupt handler, the control flow returns to the interrupted code and continues it.

On real hardware, I/O devices use a physical processor interface to trigger the interrupt. The physical processor saves the old instruction pointer and sets the instruction pointer to the interrupt handler.

In prior art virtualized environments, there are at least two levels of notifications, including notifications for the host program and notifications for the guest operating systems. Interrupts can be used for both types of notifications.

The host interrupt works almost identically to the physical hardware interrupt. A device or processor component triggers the host interrupt using a processor interface. The processor then saves the old instruction pointer and changes the control flow to the host interrupt handler. The host interrupt handler processes the notification and subsequently returns to the interrupted instruction.

The implementation of guest interrupts is a different one in prior art. The host program is responsible for guest interrupts. The host program decides if and when a guest receives an interrupt for notification.

With reference again to FIG. 3, there are steps in the control flow which are specific to a prior art hosted (virtualized) environment. The processor can execute host code 35 and 36 and guest code 33 and 34. Step 2 in FIG. 3 illustrates the moment when the host code starts/continues a guest by letting the processor execute guest code. At some point in time, the processor stops executing guest code and executes host code instead (step 1 in FIG. 3). The transition can be initiated voluntarily by the guest or involuntarily by an event. The transitions in step 1 and step 2 in FIG. 3 are quite common and happen regularly in hosted environments. A host interrupt is one of the events that triggers step 1 in FIG. 3.

If the host program needs to notify a guest, it emulates an interrupt to the guest. The host program chooses an eligible guest CPU for interrupt delivery. Subsequently, the chosen guest CPU is prepared for interrupt delivery. If the guest CPU is currently running, the host must stop this guest CPU (step 5 in FIG. 3). When the guest CPU is no longer running, the host eventually gains control (step 1 in FIG. 3) and then delivers the emulated interrupt.

In order to emulate an interrupt, the host saves the instruction pointer of the guest in the same way as physical hardware would do. Afterward, the instruction pointer is set to the address of the guest interrupt handler 31, 32 (step 4 in FIG. 3), and the guest CPU is restarted. Eventually, the guest interrupt handler 31, 32 finishes and returns to the address that is specified by the saved instruction pointer (step 3 in FIG. 3).

Another alternative used in prior art for signalization purposes is the so-called "polling procedure". During polling, a guest is active and requests status information from the host in predefined time periods. However, such polling technique is disadvantageous in that it leads to significant loss of computing resources. Furthermore, such polling technique generates delays when external events are processed.

It is thus an objective of the present disclosure to provide improved signalization within a virtual computer system.

2. SUMMARY OF THE INVENTION

The objectives of the embodiments disclosed herein are achieved by the features stated in enclosed independent claims. Further advantageous arrangements and embodiments are set forth in the respective dependent claims. Reference will now be made to the appended claims.

In short, one example of a disclosed method comprises generating a separate thread for implementing the functionality of signalization instead of interrupting the original flow of the program thread which gave rise to the signalization. The separate thread is executed by a virtual central processing unit (CPU) that is generated and dedicated exactly for this purpose of signalization. The separate thread advantageously saves computation time.

According to one exemplary embodiment, a method is disclosed for operating a hypervisor system in a hypervisor system environment comprising at least one guest system having an operating system and an additional virtual central processing unit (CPU) dedicated to signalizing at least one external event. The method comprises signalizing a first external event using the virtual CPU (instead of using an interrupt mechanism that interrupts the workflow of the respective guest system), wherein the virtual CPU is used temporarily for processing the signalization of the event.

The activities of the virtual CPU thus have a limited lifetime. Therefore, the skilled reader appreciates that the hypervisor system does not interrupt the control flow of any virtual guest CPU for signaling purposes. Moreover, certain host interprocessor signals are avoided. Furthermore, host locking issues for protecting shared data structures that transfer interrupt relevant data are avoided. Consequently, signaling latency is greatly reduced.

The virtual CPU can be switched inactive after signalization without being deleted. Alternatively, the virtual CPU can be created for processing an event and deleted after said processing of said event.

Furthermore, a designated physical hardware (physical) CPU can be used for execution of the virtual CPU, which operates the host interrupt signal of the program flow that invokes the event signalization. This saves computation time.

As an alternative to a designated physical CPU, the next free hardware (physical) CPU can be used for executing the virtual CPU.

3. BRIEF DESCRIPTION OF THE DRAWINGS

The various embodiments described herein are illustrated by way of example and is not limited by the shape of the figures of the drawings, in which.

4. DETAILED DESCRIPTION

Figure 4:
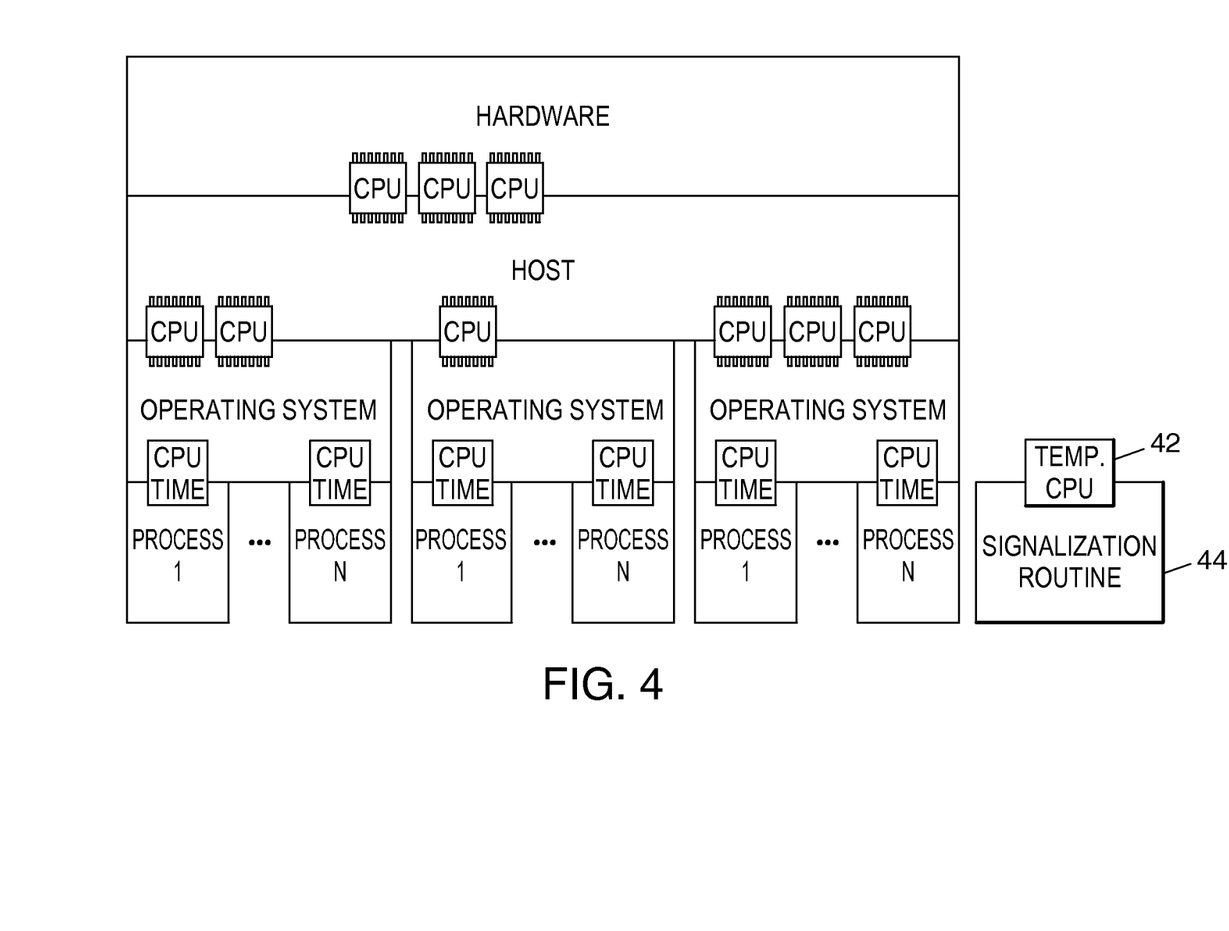
FIG. 4 is a depiction according to FIG. 2, enriched by a temporary central processing unit (CPU) and a signalization routine in accordance with one exemplary embodiment.
Figure 5:
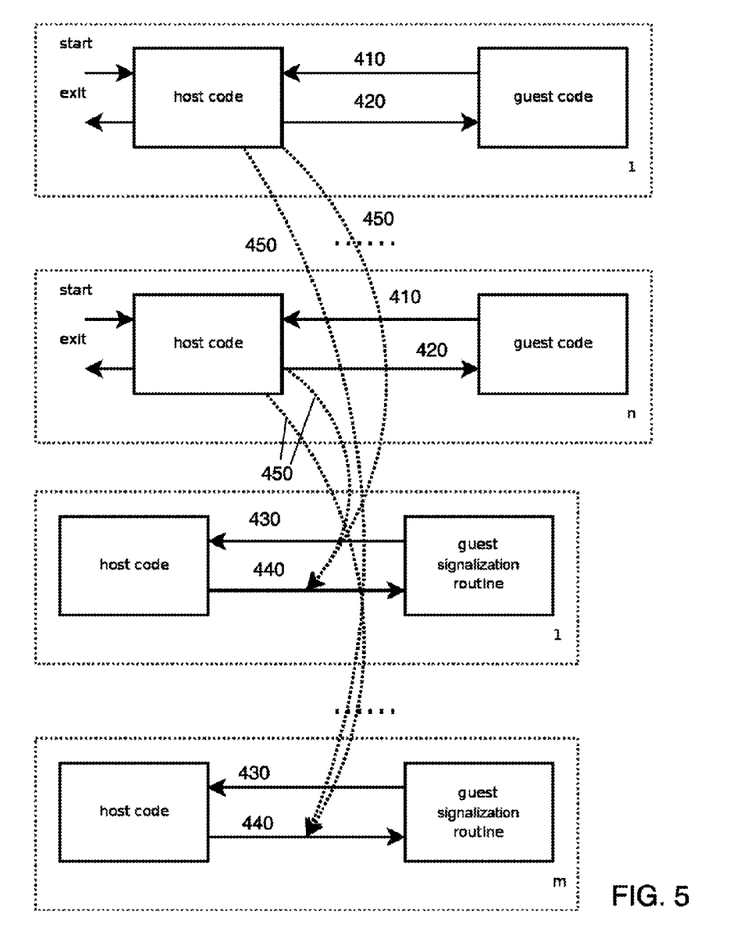
FIG. 5 illustrates the control flow of the steps of one exemplary embodiment of a method.

The system and the most important steps of the control flow of the method for guest signaling according to an exemplary embodiment, are shown in FIGS. 4 and 5 respectively. Signaling the guest signifies that some guest code will be executed at the time of the signal. More particularly, exemplary embodiments described herein permit execution of guest code for signaling purposes without interrupting currently running guest code.

Instead of interrupting a running guest processor as usually done in the prior art, a new guest processor, depicted as Temp. CPU 42 in FIG. 4, is created. The guest processor 42 can be implemented by an execution thread in the host system. It will execute the guest signalization routine 44 in FIG. 4, just as a prior art guest processor would do. However, unlike the prior art, the guest processor 42 is capable of running the guest signalization routine 44 in parallel with existing guest code.

Various embodiments described herein disclose two distinct exemplary implementations for the creation of guest CPUs for signaling purposes. In a first exemplary implementation, the host system can create and destroy guest CPUs 42 for signaling purposes in response to start and stop signals of the guest signalization routine 44, which are in turn evaluated accordingly. In an exemplary second implementation, the host system can create guest CPUs 42 for signaling on startup, and will start one CPU when needed and will suspend the CPU after the guest signalization routine 44 returns control. This CPU can be reused for the next signalization of an event.

Multiple additional guest CPUs can be used simultaneously if multiple signals must be sent to a guest.

FIG. 5 illustrates the most important steps of the control flow of the method for guest signaling according to an exemplary embodiment. Independent control flows are separated by the dotted boxes. The boxes 1 . . . n depict control flows for hypervisor-guest interaction, while boxes 1 . . . m depict control flows that are used for signaling.

A typical control flow in hosted environments contains a combination of host code and guest code. The host code can start/continue a guest by changing the program flow to guest code (step 420 in FIG. 5). The control flow can change back from guest to host code voluntarily or involuntarily. In both cases, the control flow returns to host code and continues with host code (step 410 in FIG. 5).

If the host needs to signalize an event to the guest, it creates a new runnable control flow (step 450 in FIG. 5). The newly-created control flow contains host code and the guest signalization routine. The host code is responsible for setup and cleanup. It sets up a new virtual guest CPU, and then it changes the control flow to the guest signalization routine (step 440 in FIG. 5). When the guest signalization routine finishes, the control flow returns to host code for cleanup (step 430 in FIG. 5).

Various embodiments provided herein may necessitate changes to the guest operating system. For example, the guest operating system may require tolerance of the existence of multiple processors with shared access to memory. Multiprocessing in operating systems is disclosed in the prior art and is usually implemented with methods like locking and atomic updates. The virtual guest CPU used for signalization purposes as described in the present disclosure uses methods to interact with existing guest CPUs. In addition, the guest operating system may require the provision of a signalization routine for execution on the virtual processor during signalization. The signalization routine, in many examples, may be exploited by other components like device drivers. Such components should, in most cases, be appropriately modified to use the signalization routine instead of an interrupt handler.

Various embodiments provided herein may also provide a method to communicate to the host the memory address of the guest signalization routine. Various prior art methods used for interrupts can be used for the signalization routine as well, including:

using a predefined memory location for the signalization routine
using indirect addressing—i.e., using a predefined memory location that contains an address specifying the memory location of the signalization routine
using a method in which the guest uses a guest-host interface to communicate to the host the memory location of the signalization routine The host must implement a method for creating the virtual guest CPU while a guest is running. It also should implement a method to regain control if the signalization routine does not return due to programming errors or malicious code.

A skilled reader will appreciate that the various method embodiments described herein can be implemented in various ways so that the method can be incorporated into various virtualization variants as they appear in prior art. For instance, virtualization based on hardware support like Start Interpretive Execution (SIE) found on IBM Mainframes, Intel Virtualization Technology (IVT), or AMD Virtualization (AMD-V) can utilize various method embodiments presented herein. SIE, IVT, and AMD-V provide processor instructions to set the processor in a special mode that permits code to run on behalf of a guest. In order to implement the method with such virtualization variants, the following details may be implemented: The host may implement code that sets up a hardware-specific description for a new virtual guest CPU. At signalization time, the host may then ensure that the new CPU will be properly integrated with the existing guest CPUs. For example, the new CPU may share memory with the existing guest CPUs. Integration of the new CPU with the existing guest CPUs may adhere to the requirements provided by the virtualization method (SIE, IVT, or AMD-V).

The same is true for so-called "trap based virtualization" that is implemented, e.g., in the POWER platform. In trap based virtualization environments, the guest code runs natively on the processor. A specific subset of the instruction causes a trap and returns control back to the host program for emulation. Adding a new CPU usually requires adding an additional control flow that shares memory with existing ones. This control flow is used to execute the guest signalization routine.

Moreover, various embodiments provided herein can be incorporated into hardware-emulating software variants such as bochs and qemu (i.e., software that emulates the hardware of complete PCs, such as software that emulates an INTEL PC on a Power PC chip). Since with such variants all CPUs are simulated completely in software, the concept of adding a new virtual guest CPU for signalization can be easily implemented by adding code in the control code of the simulator that ensures that the newly-simulated CPU behaves like an additional CPU in a multiprocessor configuration. So long as the code is capable of handling multiprocessor configurations, the code parts that simulate the instructions can be reused.

Furthermore, there are hardware-emulating software variants that run parts of guest code natively on the processor using methods like code morphing, code caching or just-in-time-compile to provide virtualization (e.g., VMWare). Various embodiments can be incorporated into such variants by adapting the control code. The code parts that perform the translation can be reused.

The various method embodiments provided herein also can be varied by using both signalization routines and interrupts in a mixed mode—i.e., the signalization routines according to the various embodiments described herein can be used in conjunction with interrupts. This is advantageous for the following cases:

Guest operating systems with a large set of device drivers: Permitting these drivers to use the interrupt method permits implementation on a step-by-step basis, starting with the drivers/event handlers that profit most from implementation of the various embodiments described herein.
Idle guest CPUs: If some or all guest CPUs are "sleeping", an interrupt will behave like a wakeup. Starting a virtual CPU for signaling has no advantage over a wakeup.
Critical events concerning the current workflow: Sometimes it is necessary to interrupt the current workflow to notify the operating system about critical events that will affect the workflow. For example, machine check interrupts dealing with processor or memory defects can be used to terminate a currently running guest process when necessary.

The various embodiments described herein can take the form of an entirely hardware embodiment, an entirely software embodiment, or an embodiment containing both hardware and software elements. Some embodiments may be implemented in software, which includes but is not limited to firmware, resident software, and/or microcode.

Furthermore, the various embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disc-read only memory (CD-ROM), compact disc-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The invention claimed is:

1. A method for operating a hypervisor system in a hypervisor system environment comprising at least one guest system executing guest code, the method comprising:
    creating a new processor control flow including a guest signalization routine and host code for setting up a virtual central processing unit (CPU) dedicated exactly to signalization, wherein activities of said virtual CPU start and stop based on signalization; and
    signalizing a first external event via said guest signalization routine using said virtual CPU, wherein said guest signalization routine is executed in parallel with said guest code.

2. The method according to claim 1, wherein said virtual CPU is switched inactive after said signalizing of said first external event without being deleted.

3. The method according to claim 1, wherein said virtual CPU is created for said signalizing of said first external event and is deleted after said signalizing of said first external event.

4. The method according to claim 1, wherein a designated hardware CPU is used for executing said virtual CPU, which operates a host interrupt signal of the program flow that invokes said signalizing of said first external event.

5. The method according to claim 1, wherein a next free hardware CPU is used for executing said virtual CPU.

6. The method according to claim 1, wherein the method further comprises signalizing a second external event using a respective guest system among the at least one guest system, wherein signalizing said second external event comprises using an interrupt mechanism to interrupt a workflow of the respective guest system.

7. The method according to claim 1, wherein said hypervisor system environment comprises more than one guest system.

8. A hypervisor system environment comprising:
    at least one hardware central processing unit (CPU); and
    a hypervisor system comprising at least one guest system executing guest code and a host configured for creating a new processor control flow including host code for setting up a virtual central processing unit (CPU) and a guest signalization routine for signalizing at least one external event using said virtual CPU, wherein said virtual CPU is dedicated exactly to signalization, wherein activities of said virtual CPU start and stop based on signalization, and wherein said guest signalization routine is executed in parallel with said guest code.

9. A non-transitory computer-usable medium storing an application which, when executed on a processor, performs steps for operating a hypervisor system in a hypervisor system environment comprising at least one guest system executing guest code, the steps comprising:
    creating a new processor control flow including a guest signalization routine and host code for setting up a virtual central processing unit (CPU) dedicated exactly to signalization, wherein activities of said virtual CPU start and stop based on signalization; and
    signalizing a first external event via said guest signalization routine using said virtual CPU, wherein said guest signalization routine is executed in parallel with said guest code.

10. The hypervisor system environment according to claim 8, wherein said virtual CPU is switched inactive after said signalizing of said first external event without being deleted.

11. The hypervisor system environment according to claim 8, wherein said virtual CPU is created for said signalizing of said first external event and is deleted after said signalizing of said first external event.

12. The hypervisor system environment according to claim 8, wherein a designated hardware CPU is used for executing said virtual CPU, which operates a host interrupt signal of program flow that invokes said signalizing of said first external event.

13. The hypervisor system environment according to claim 8, wherein a next free hardware CPU among the at least one hardware CPU is used for executing said virtual CPU.

14. The hypervisor system environment according to claim 8, wherein a guest interrupt handler of a respective guest system among the least one guest system signalizes a second external event, and wherein said second external event is signalized using an interrupt mechanism to interrupt a workflow of the respective guest system.

15. The hypervisor system environment according to claim 8, wherein said hypervisor system environment comprises more than one guest system.

16. The non-transitory computer-usable medium according to claim 9, wherein said virtual CPU is switched inactive after said signalizing of said first external event without being deleted.

17. The non-transitory computer-usable medium according to claim 9, wherein said virtual CPU is created for said signalizing of said first external event and is deleted after said signalizing of said first external event.

18. The non-transitory computer-usable medium according to claim 9, wherein a designated hardware CPU is used for executing said virtual CPU, which operates a host interrupt signal of a program flow that invokes said signalizing of said first external event.

19. The non-transitory computer-usable medium according to claim 9, wherein a next free hardware CPU is used for executing said virtual CPU.

20. The non-transitory computer-usable medium according to claim 9, wherein the steps further comprise signalizing a second external event using a respective guest system among the at least one guest system, wherein signalizing said second external event comprises using an interrupt mechanism to interrupt a workflow of the respective guest system.

\* \* \* \* \*